US007881996B1

(12) United States Patent  
Schulz

(10) Patent No.: US 7,881,996 B1  
(45) Date of Patent: Feb. 1, 2011

(54) METHOD AND SYSTEM FOR SCREENING FINANCIAL TRANSACTIONS

(75) Inventor: Larry Schulz, Atlanta, GA (US)

(73) Assignee: Federal Reserve Bank of Atlanta, Atlanta, GA (US)

( * ) Notice: Subject to any disclaimer, the term of this patent is extended or adjusted under 35 U.S.C. 154(b) by 848 days.

(21) Appl. No.: 11/195,885

(22) Filed: Aug. 3, 2005

Related U.S. Application Data

(60) Provisional application No. 60/598,238, filed on Aug. 3, 2004.

(51) Int. Cl.  
*G06Q 40/00* (2006.01)
(52) U.S. Cl. ............................ 705/35; 705/36; 705/37; 705/38; 705/39; 705/40; 705/41; 705/42; 705/43; 705/44; 705/45
(58) Field of Classification Search .................. 705/35, 705/30, 36, 38–40, 42, 43, 50; 709/200; 713/168, 187

See application file for complete search history.

(56) References Cited

U.S. PATENT DOCUMENTS

| | | | |
|---|---|---|---|
| 4,270,042 A | 5/1981 | Case | |
| 4,727,243 A | 2/1988 | Savar | |
| 4,823,264 A | 4/1989 | Deming | |
| 5,121,945 A | 6/1992 | Thomson et al. | |
| 5,175,682 A | 12/1992 | Higashiyama et al. | |
| 5,448,043 A | 9/1995 | Nakano et al. | |
| 5,532,464 A | 7/1996 | Josephson et al. | |
| 5,691,524 A | 11/1997 | Josephson | |
| 5,717,868 A | 2/1998 | James | |
| 5,742,819 A | 4/1998 | Caccavale | |
| 5,761,510 A | 6/1998 | Smith et al. | |
| 5,783,808 A | 7/1998 | Josephson | |
| 5,787,402 A | 7/1998 | Potter et al. | |
| 5,790,778 A | 8/1998 | Bush et al. | |

(Continued)

FOREIGN PATENT DOCUMENTS

WO    WO 00/30053    5/2000

(Continued)

OTHER PUBLICATIONS

VAn Natta, D. & O'Brien, T., Flow of Saudis' Cash to Hamas Is Scrutinized, NY Times, Sep. 17. 2003.*

(Continued)

*Primary Examiner*—Charles R Kyle  
*Assistant Examiner*—Robert R Niquette  
(74) *Attorney, Agent, or Firm*—King & Spalding

(57) ABSTRACT

Efficiently screening ACH items and providing an indicator of the screening result. Electronic files, which can be in the NACHA file format, comprise ACH items. A gateway operator or an originating financial institution can screen each ACH item using a screening software module. For each ACH item, an indicator associated with the screening can be inserted into the ACH file before the ACH item is forwarded to a receiving financial institution. The indicator can identify whether the screening produced a match against an interdiction list and/or whether the screening produced a false positive. If the screening produced a match, processing of the ACH item can be suspended, and the ACH item can be returned to the originating financial institution. Notification of the match can be transmitted to the originating financial institution, the receiving financial institution, and/or law enforcement authorities.

39 Claims, 12 Drawing Sheets

Outbound Item - Screen with Indicator

U.S. PATENT DOCUMENTS

| | | | |
|---|---|---|---|
| 5,794,234 A | 8/1998 | Church et al. | |
| 5,825,003 A | 10/1998 | Jennings et al. | |
| 5,848,400 A | 12/1998 | Chang | |
| 5,852,812 A | 12/1998 | Reeder | |
| 5,903,878 A | 5/1999 | Talati et al. | |
| 5,940,813 A | 8/1999 | Hutchings | |
| 5,946,669 A | 8/1999 | Polk | |
| 5,956,700 A | 9/1999 | Landry | |
| 5,963,647 A | 10/1999 | Downing et al. | |
| 5,963,648 A | 10/1999 | Rosen | |
| 5,978,485 A | 11/1999 | Rosen | |
| 6,026,379 A | 2/2000 | Haller et al. | |
| 6,032,133 A | 2/2000 | Hilt et al. | |
| 6,061,665 A | 5/2000 | Bahreman | |
| 6,076,064 A | 6/2000 | Rose, Jr. | |
| 6,076,074 A | 6/2000 | Cotton et al. | |
| 6,098,053 A | 8/2000 | Slater | |
| 6,119,107 A | 9/2000 | Polk | |
| 6,141,651 A | 10/2000 | Riley et al. | |
| 6,173,272 B1 | 1/2001 | Thomas et al. | |
| 6,205,433 B1 | 3/2001 | Boesch et al. | |
| 6,216,115 B1 | 4/2001 | Barrameda et al. | |
| 6,243,689 B1 | 6/2001 | Norton | |
| 6,246,999 B1 | 6/2001 | Riley et al. | |
| 6,269,345 B1 | 7/2001 | Riboud | |
| 6,304,860 B1 | 10/2001 | Martin, Jr. et al. | |
| 6,317,745 B1 | 11/2001 | Thomas et al. | |
| 6,408,284 B1 | 6/2002 | Hilt et al. | |
| 6,598,028 B1 | 7/2003 | Sullivan et al. | |
| 6,615,258 B1 | 9/2003 | Barry et al. | |
| 6,629,081 B1 | 9/2003 | Cornelius et al. | |
| 6,721,715 B2 | 4/2004 | Nemzow | |
| 6,754,640 B2 | 6/2004 | Bozeman | |
| 6,829,590 B1 | 12/2004 | Greener et al. | |
| 6,856,970 B1 | 2/2005 | Campbell et al. | |
| 6,868,408 B1 | 3/2005 | Rosen | |
| 6,873,972 B1 | 3/2005 | Marcial et al. | |
| 6,892,184 B1 | 5/2005 | Komem | |
| 7,004,382 B2 | 2/2006 | Sandru | |
| 7,016,876 B1 * | 3/2006 | Lanier et al. | 705/45 |
| 7,103,577 B2 | 6/2006 | Blair | |
| 7,120,606 B1 | 10/2006 | Ranzini et al. | |
| 7,269,575 B1 | 9/2007 | Concannon et al. | |
| 7,330,835 B2 | 2/2008 | Deggendorf | |
| 7,333,953 B1 * | 2/2008 | Banaugh et al. | 705/40 |
| 7,580,886 B1 | 8/2009 | Schulz | |
| 2001/0034682 A1 | 10/2001 | Knight et al. | |
| 2001/0034702 A1 | 10/2001 | Mockett et al. | |
| 2002/0016769 A1 | 2/2002 | Barbara et al. | |
| 2002/0029194 A1 | 3/2002 | Lewis et al. | |
| 2002/0032642 A1 | 3/2002 | Chichilnisky | |
| 2002/0035561 A1 | 3/2002 | Archer et al. | |
| 2002/0038305 A1 | 3/2002 | Bahl et al. | |
| 2002/0055904 A1 | 5/2002 | Mon | |
| 2002/0072942 A1 | 6/2002 | Kuykendall et al. | |
| 2002/0077971 A1 | 6/2002 | Allred | |
| 2002/0082962 A1 | 6/2002 | Farris et al. | |
| 2002/0087455 A1 | 7/2002 | Tsagarakis et al. | |
| 2002/0099656 A1 | 7/2002 | Poh Wong | |
| 2002/0120537 A1 | 8/2002 | Morea et al. | |
| 2002/0120846 A1 * | 8/2002 | Stewart et al. | 713/168 |
| 2002/0161692 A1 | 10/2002 | Loh et al. | |
| 2002/0161707 A1 | 10/2002 | Cole et al. | |
| 2002/0185529 A1 | 12/2002 | Cooper et al. | |
| 2003/0018554 A1 | 1/2003 | Lyftogt et al. | |
| 2003/0024979 A1 | 2/2003 | Hansen et al. | |
| 2003/0033228 A1 * | 2/2003 | Bosworth-Davies et al. | 705/35 |
| 2003/0050892 A1 | 3/2003 | Clynes et al. | |
| 2003/0055756 A1 | 3/2003 | Allan | |
| 2003/0065594 A1 | 4/2003 | Murphy | |
| 2003/0065941 A1 | 4/2003 | Ballard et al. | |
| 2003/0070080 A1 * | 4/2003 | Rosen | 713/187 |
| 2003/0105710 A1 | 6/2003 | Barbara et al. | |
| 2003/0126094 A1 | 7/2003 | Fisher et al. | |
| 2003/0144942 A1 * | 7/2003 | Sobek | 705/36 |
| 2003/0158811 A1 | 8/2003 | Sanders et al. | |
| 2003/0167223 A1 | 9/2003 | Pledereder et al. | |
| 2003/0167237 A1 | 9/2003 | Degen et al. | |
| 2003/0177087 A1 * | 9/2003 | Lawrence | 705/38 |
| 2003/0182227 A1 * | 9/2003 | Guzman | 705/39 |
| 2003/0187783 A1 * | 10/2003 | Arthus et al. | 705/39 |
| 2003/0187792 A1 | 10/2003 | Hansen et al. | |
| 2003/0208439 A1 | 11/2003 | Rast | |
| 2003/0208440 A1 | 11/2003 | Harada et al. | |
| 2003/0208445 A1 | 11/2003 | Compiano | |
| 2003/0220878 A1 * | 11/2003 | Degen et al. | 705/50 |
| 2003/0229586 A1 * | 12/2003 | Repak | 705/39 |
| 2003/0233319 A1 * | 12/2003 | Lawrence | 705/39 |
| 2004/0002914 A1 | 1/2004 | Munro | |
| 2004/0006533 A1 | 1/2004 | Lawrence | |
| 2004/0024709 A1 * | 2/2004 | Yu et al. | 705/43 |
| 2004/0030621 A1 | 2/2004 | Cobb | |
| 2004/0034594 A1 | 2/2004 | Thomas et al. | |
| 2004/0078328 A1 | 4/2004 | Talbert et al. | |
| 2004/0078332 A1 | 4/2004 | Ferguson et al. | |
| 2004/0083167 A1 | 4/2004 | Kight et al. | |
| 2004/0093305 A1 * | 5/2004 | Kight et al. | 705/40 |
| 2004/0109596 A1 | 6/2004 | Doran | |
| 2004/0117299 A1 * | 6/2004 | Algiene et al. | 705/39 |
| 2004/0128240 A1 * | 7/2004 | Yusin | 705/39 |
| 2004/0138973 A1 | 7/2004 | Keis et al. | |
| 2004/0143621 A1 * | 7/2004 | Fredrickson et al. | 709/200 |
| 2004/0148255 A1 | 7/2004 | Beck et al. | |
| 2004/0153403 A1 * | 8/2004 | Sadre | 705/39 |
| 2004/0199463 A1 * | 10/2004 | Deggendorf | 705/39 |
| 2004/0205011 A1 | 10/2004 | Northington et al. | |
| 2004/0236646 A1 * | 11/2004 | Wu et al. | 705/30 |
| 2005/0004872 A1 * | 1/2005 | Gavin et al. | 705/42 |
| 2005/0021454 A1 | 1/2005 | Karpovich et al. | |
| 2005/0038743 A1 | 2/2005 | Stanley et al. | |
| 2005/0044043 A1 | 2/2005 | Gooding et al. | |
| 2005/0086136 A1 | 4/2005 | Love et al. | |
| 2005/0167481 A1 | 8/2005 | Hansen et al. | |
| 2005/0177464 A1 | 8/2005 | Komem et al. | |
| 2005/0209961 A1 | 9/2005 | Michelsen et al. | |
| 2006/0167784 A1 | 7/2006 | Hoffberg | |
| 2009/0157550 A1 | 6/2009 | Fraher et al. | |

FOREIGN PATENT DOCUMENTS

| | | | |
|---|---|---|---|
| WO | WO0030053 | | 5/2000 |
| WO | WO 01/86546 | * | 11/2001 |

OTHER PUBLICATIONS

Eurogiro, Development of Interface Between FED and Eurogiro, Request for Proposal, Jan. 14, 2003, Uwe Holmsgaard, Eurogiro Network A/S.

Fedline User Guide, ACH, Version 2.4, Mar. 2002, including Fedline User Guide, Host Communications, Version 2.4, Jun. 1997.

ACH Goes Across the Border, South Florida Banking Institute, Vicki Anderson, Retail Payments Office, Federal Reserve System, Oct. 29, 2001.

William B. Nelson, ACH News From Europe, Payments Journal, Jan./Feb. 2002.

International ACH—Expanding the Gateway Concept Beyond Canada, Vicki Anderson, Retail Payments Office, Federal Reserve System, Apr. 15, 2002.

International Direct Deposit Technical Walkthru, Prepared for IRPPO, Oct. 9, 2002.

FedACH^SM Product Development Discussion, Federal Reserve Financial Services, U.S. Bank, Nov. 30, 2001.

International Direct Deposit Overview, Electronic Payments, EROC, Federal Reserve Bank of New York, Oct. 9, 2002.

Overview of the Federal Reserve System's Check to ACH Conversion (CTAC) Product, Presented Feb. 15, 2002.

Overview, Federal Reserve and Check to ACH Conversion (CTAC), Presented to SWACHA—The Electronic Payments Resource, Jul. 31, 2002.

The Federal Reserve & Check-to-ACH Conversion, NACHA Electronic Check Conference, Sep. 23-24, 2002, Terry Roth, Retail Payments Office of the Federal Reserve System.

2002 ACH Rules, A Complete Guide to Rules & Regulations Governing the ACH Network, National Automated Clearing House Association, Copyright 2002. Attached pp. 1) Understanding the ACH Network: An ACH Primer, pp. 1-17; 2) Operating Rules of the National Automated Clearing House Association, Article Eight, pp. 28-29; 3) Operating Guidelines of the National Automated Clearing House Association: Section II, Chapter III, pp. 40-45; and Section IV, Chapter VI, pp. 120-140; and 4) Federal Reserve Bank Uniform Operating Circular [No. 4] on Automated Clearing House Items, Jun. 25, 2001.

PC AIMS User's Guide, Credit Controls, pp. 10-1 to 10-8, Feb. 25, 2002.

EPN Voice Response System (RALPH), Applicants submit that this document was published prior to Sep. 30, 2003.

NACHA Rule Amendment for Third-Party Service Providers: A Case Study, Chris Daniel, Partner, Alston & Bird LLP.

The Impact of NACHA Rule Changes on Third Party Service Providers, Dec. 15, 2004, Deborah Shaw, Senior Director of Network Services, NACHA.

NACHA Third Party ACH Rules: Improving Risk Management for Financial Institutions, Dec. 15, 2004, Mary O'Toole, Vice President, Bank of America.

U.S. Appl. No. 60/416,663, filed Oct. 7, 2002, Yusin.

SEI Investments Utilizes CheckFree RECON Securities to Automate Reconciliation Processes PR Newswire, New York: Jun. 24, 2002; p. 1.

Bills, Steve; Clearing House Lets Depositories Share Fraud Data; American Banker; New York, N.Y.; Oct. 12, 2001; vol. 167, Iss. 196; p. 9.

Kingston, Jennifer A.; Twi Players Retrenching, Visa Quits Processing; Dec. 3, 2002; American Banker; v167n230, p. 1.

Fed Extending ACH Services to 6 Nations; Mar. 7, 2003; American Banker; v168n45, p. 1.

McClelland, Kelly R.; International ACH: Best Kept Secret for Low Cost Payments; Mar./Apr. 2004; AFP Exchange; V24n2; pp. 44+.

Clearing House Lets Depositories Share Fraud Data Steve Bills. American Banker. New York, N.Y.: Oct. 12, 2001. vol. 167, Iss. 196; p. 9.

PC AIMS User's Guide, Credit Controls, pp. 10-1 to 10-8, Feb. 25, 2002.

EPN Voice Response System (RALPH), Applicants submit that this document was published prior to Sep. 30, 2003.

NACHA Rule Amendment for Third-Party Service Providers: A Case Study, Chris Daniel, Partner, Alston & Bird LLP.

The Impact of NACHA Rule Changes on Third Party Service Providers, Dec. 15, 2004, Deborah Shaw, Senior Director of Network Services, NACHA.

NACHA Third Party ACH Rules: Improving Risk Management for Financial Institutions, Dec. 15, 2004, Mary O'Toole, Vice President, Bank of America.

Homsgaard, Uwe, "Eurogiro, Development of Interface Between FED and Eurogiro", Request for Proposal, Jan. 14, 2003, Eurogiro Network A/S.

"Fixed-to-Fixed Foreign Exchange (F3x) Pilot Overview"; Dec. 18-19, 2006.

"Fixed-to-Fixed Foreign Exchange (F3x) Pilot Overview"; Oct. 25, 2007.

Abraham Silberschatz and Peter Galvin, Operating System Concepts, 1994, Addison-Wesley Publishing Company, Inc. 4$^{th}$ Edition, pp. 20-23.

Giles Brassard and Paul Bratley, Fundamentals of Algorithmics, 1996, Prentice-Hall Inc. pp. 376-380.

* cited by examiner

Exemplary Architecture

Exemplary Architecture - Alternative Embodiment

Outbound Item - Screen with Indicator

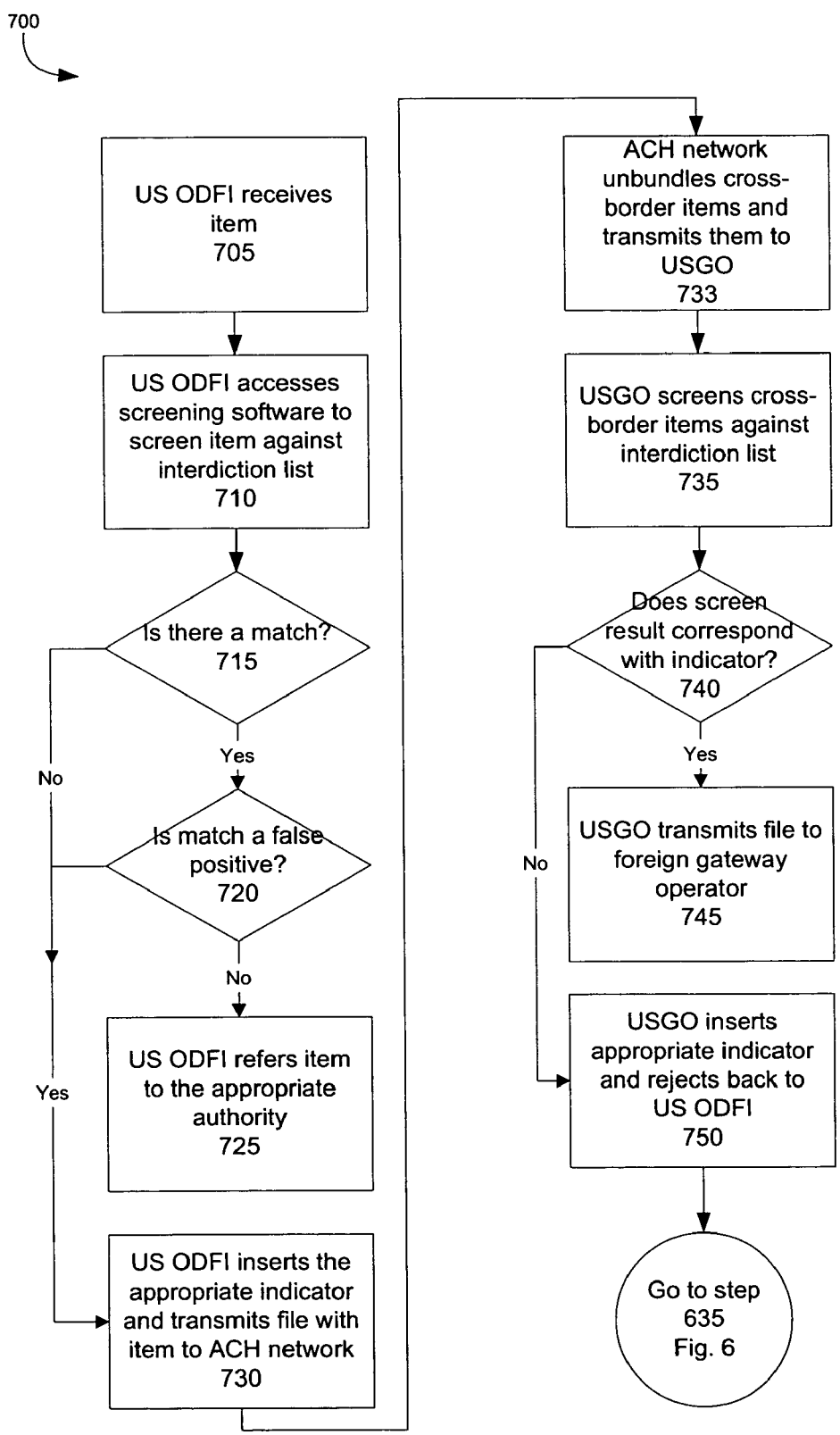
Fig. 7  Outbound Item - Optional Pre-Screen

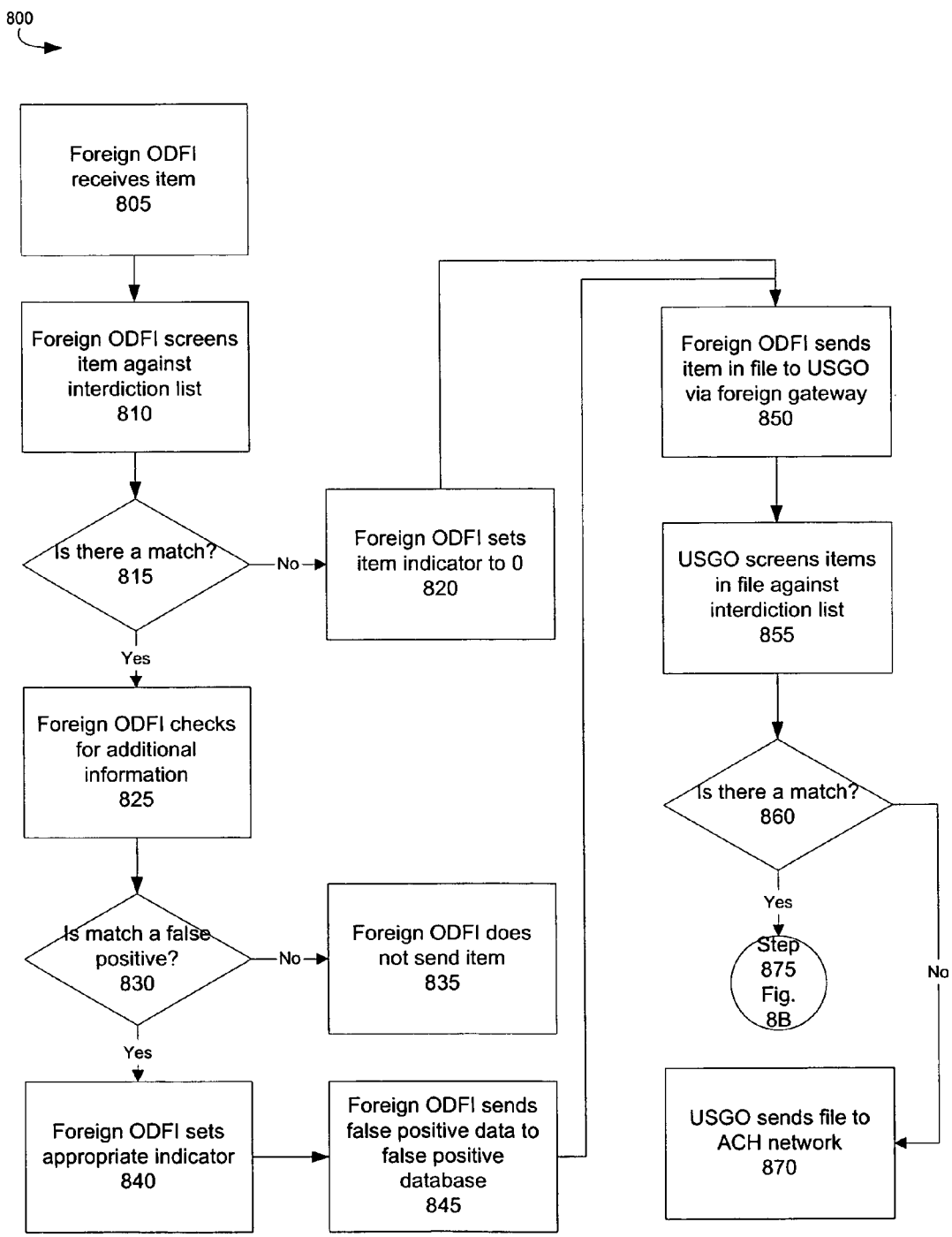
Fig. 8A   Inbound Item - Complex Screen

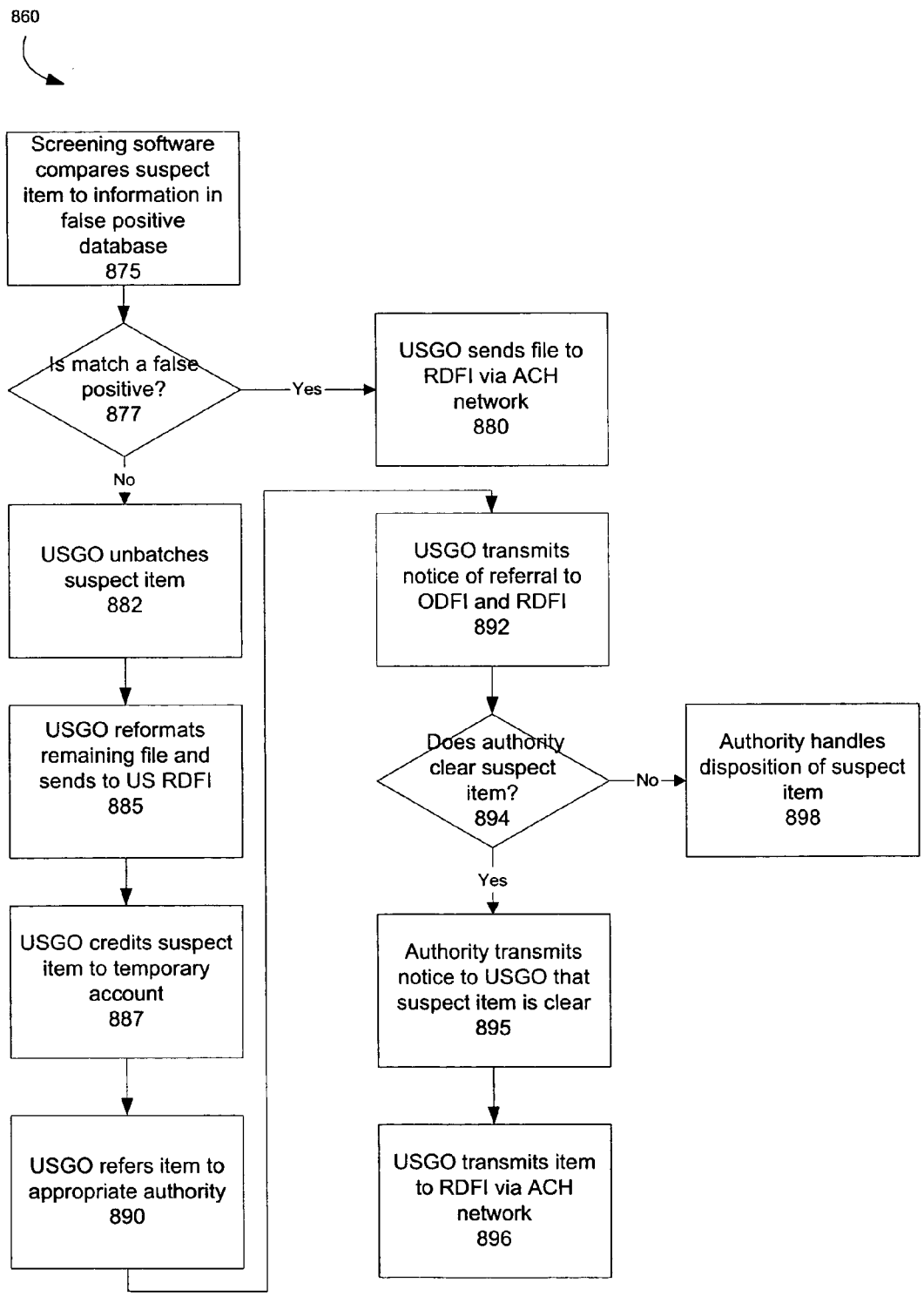
Fig. 8B   Inbound Item - Complex Screen

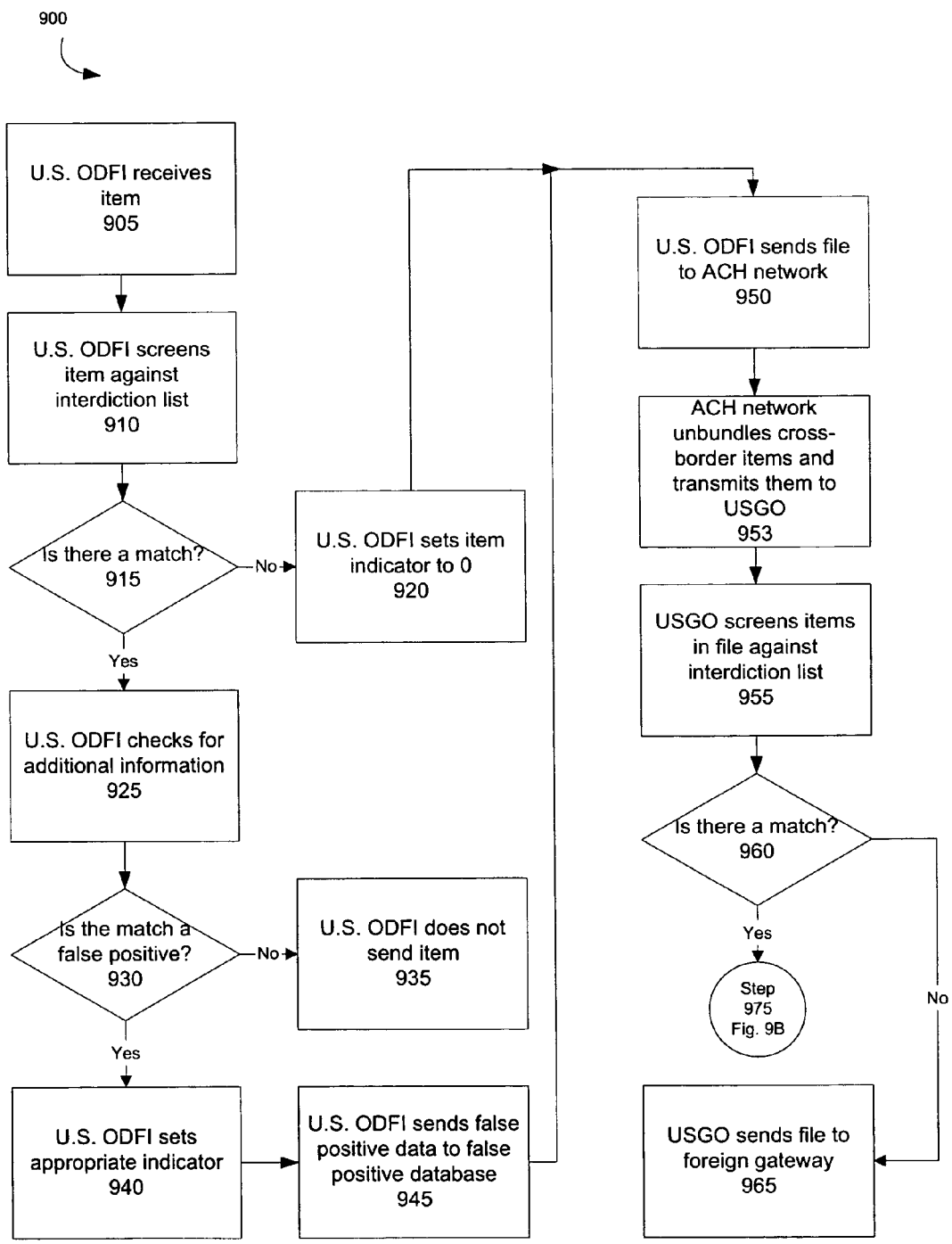
Fig. 9A  Outbound Item - Complex Screen

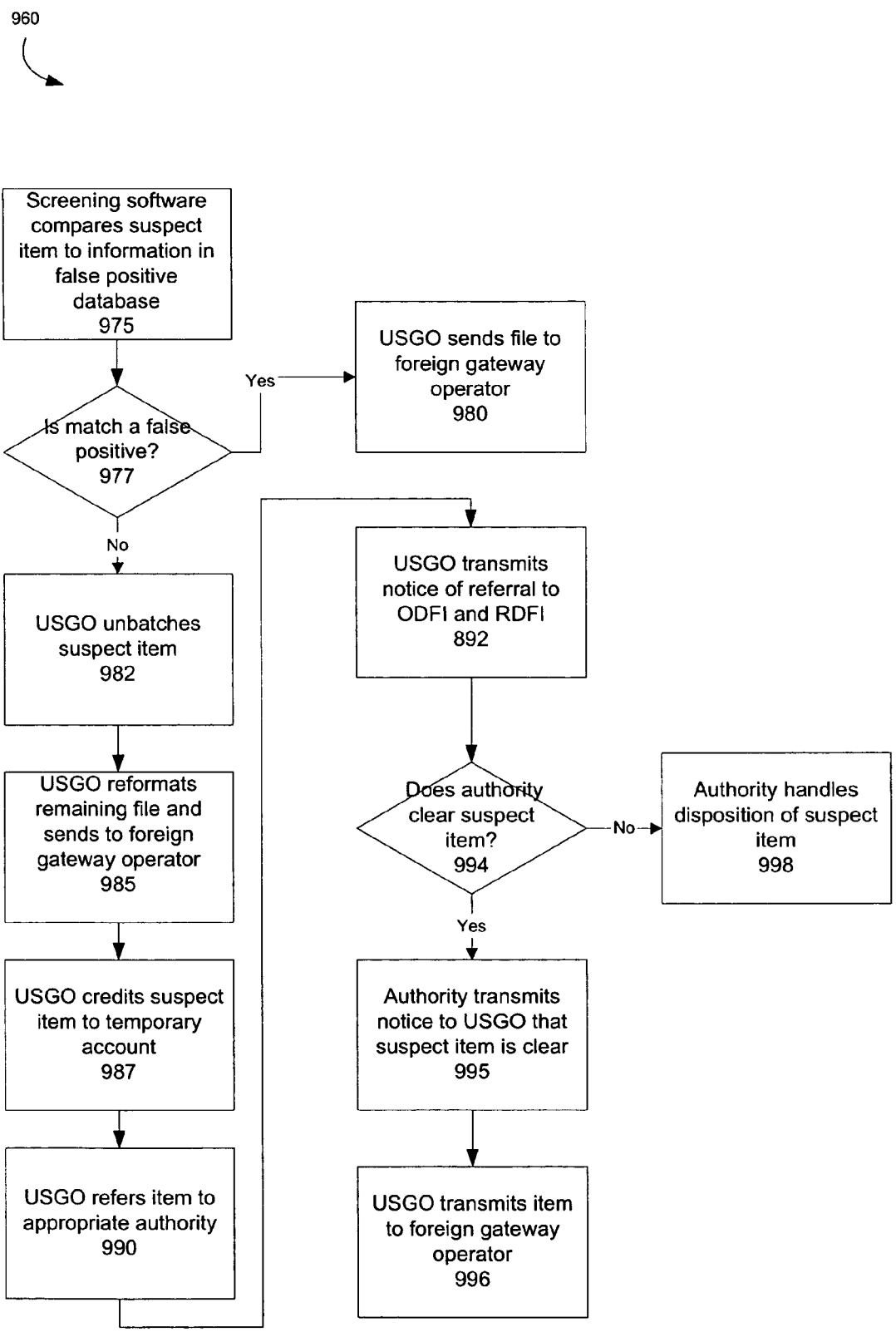
Fig. 9B  Outbound Item - Complex Screen

Exemplary File Structure - NACHA Formatted File

METHOD AND SYSTEM FOR SCREENING FINANCIAL TRANSACTIONS

RELATED PATENT APPLICATIONS

The present patent application claims priority under 35 U.S.C. §119 to U.S. Provisional Patent Application No. 60/598,238, entitled "Method and System for Screening Financial Transactions," filed Aug. 3, 2004, which is hereby incorporated by reference, and is related to U.S. patent application Ser. No. 10/868,729, entitled "Method and System for Conducting International Electronic Financial Transactions," filed Jun. 15, 2004, which is hereby incorporated by reference.

FIELD OF THE INVENTION

The present invention relates generally to screening financial transactions, and more particularly to efficiently screening transactions and providing an indicator of the screening result.

BACKGROUND OF THE INVENTION

Financial institutions are increasingly clearing financial transactions using electronic systems such as the Automated Clearinghouse ("ACH") network. The ACH network is a nationwide electronic funds transfer system supported by several operators, including the Federal Reserve Banks and other institutions. The ACH network is governed by a set of rules, which are administered by the National Automated Clearinghouse Association ("NACHA"). Financial institutions generally use the ACH network to clear low value, high volume financial transactions. Financial institutions collect transactions and package them in batched ACH files, according to the NACHA rules, for forwarding to other institutions. Typically, the transactions are bundled as ACH items in a single ACH file before being transmitting over the ACH network. The terms "financial transaction," "transaction," "ACH transaction," "ACH item," and "item" are used interchangeably herein to refer to any batched processed electronic payment, whether international or domestic. The terms "ACH file," "electronic file," and "file" are used interchangeably herein to refer to any collection of batched and/or unbatched ACH items.

The ACH network is being expanded for use with financial institutions in other countries. One of the challenges presented by international ACH transactions is the ability to police fraudulent and criminal financial transactions. Certain international financial transactions are subject to monitoring to identify criminals or fraudulent activity. For example, wire transfers, which typically involve a single, large value transaction, are often screened to ensure the payment is not originating from or destined for an account held by a criminal. Screening wire transfers assists governments with enforcing laws and reducing criminal activity. Such screens typically utilize a false positives database to prevent improper rejection of certain screened items. A false positives database can include, for example, information regarding individuals with names similar to those named on a screening list. Without a false positives database, certain data shows that between ten and fifteen percent of rejected items will be false positives.

Screening generally has not been applied to the low value, high volume transactions cleared over the ACH network. Accordingly, there is a need in the art for a system and method that efficiently screens a high volume of financial transactions. Specifically, there is a need to screen ACH items to ensure that criminal and fraudulent activity is not being conducted through international ACH transactions. There is a further need to conduct the screening efficiently and to avoid false positives so as to minimize the number of ACH items that are suspended, returned, or investigated.

SUMMARY OF THE INVENTION

The present invention overcomes the foregoing limitations of the prior art by providing systems and methods for efficiently screening ACH items and providing an indicator of the screening result. Specifically, the present invention allows financial institutions to efficiently screen ACH items against an interdiction list. The interdiction list comprises information identifying certain persons (or entities) who are prohibited from conducting certain financial transactions. For example, the interdiction list can comprise a list of names, addresses, social security numbers, bank accounts, and/or any other type of information that can be used to identify a person. As used herein, the term "financial institution" means any person or entity operating in the financial industry and any software modules accessible thereto. The financial institutions can remotely or locally access a screening software module to perform the screening. The screening software module can be coupled to one or more databases of false positives used to minimize screening errors. Based on the screening result, an indicator that indicates the screening result can be associated with the screened ACH item. Typically, each ACH item is contained within an electronic file, which can be in the NACHA file format. The indicator associated with a particular ACH item can be inserted in that ACH item's electronic file.

One aspect of the present invention relates to a method for screening an ACH item between a sending customer and a receiving customer. A screening entity, which can comprise a financial institution, receives a file for screening from a first financial institution. The file comprises the ACH item and can be in the NACHA file format. The first financial institution can be, for example, an originating depository financial institution or a gateway operator. The screening entity preliminarily determines whether the sending customer, the receiving customer, or both the sending customer and the receiving customer, are identified on an interdiction list. In making that determination, the screening entity can compare, e.g., the names, addresses, bank account numbers, social security numbers, and/or any other type of identifying information, of the sending customer and the receiving customer to information on the interdiction list. It also can consider information in a list of false positives, which can have been created by the first financial institution, to determine that, though certain information about a customer matches information on an interdiction list, the customer is not actually identified on the interdiction list.

Responsive to the preliminary determination of whether at least one of the sending customer and the receiving customer is identified on the interdiction list, the screening entity can associate an indicator with the ACH item in the electronic file. That indicator can indicate the screening result. For example, the indicator can indicate that neither of the customers is identified on the interdiction list. Alternatively, the indicator can indicate that at least one of the customers is identified on the interdiction list.

If it is preliminarily determined that at least one of the sending customer and the receiving customer is identified on the interdiction list, the screening entity can determine whether the ACH item should nevertheless be processed. For example, it can determine whether the identification was a false positive. If so, it can determine that the ACH item should be processed, and if not, it can determine that the ACH item should not be processed. If the screening entity determines that at least one of the customers is identified on the interdiction list and/or that ACH item should not be processed, the screening entity can send a notification to a law enforcement authority. That notification can comprise a copy of the ACH item.

To determine whether the preliminary identification was a false positive, the screening entity can first consult a list of false positives. If the customer preliminarily identified on the interdiction list is identified on the list of false positives, the screening entity can determine that the preliminary identification was a false positive. If the customer preliminarily identified on the interdiction list is not identified on the list of false positives, the screening entity can transmit to the first financial institution the ACH item and/or a request for instructions on whether to process the ACH item. The first financial institution can then evaluate whether the preliminary identification was a false positive, and thus, whether the ACH item should be processed.

If the first financial institution determines that the preliminary identification was a false positive, it can transmit the ACH item to a second financial institution, e.g., the screening entity, a gateway operator, or a receiving depository financial institution, for processing. Alternatively, it can transmit instructions to process the ACH item to the second financial institution. It can also add information about the false positive to the list of false positives. The first financial institution or the screening entity can associate an indicator that indicates whether the identification was a false positive with the ACH item in the electronic file.

Another aspect of the present invention relates to a system for screening an ACH item between a sending customer and a receiving customer. A data storage medium can comprise an interdiction list. A first gateway operator can be operable to receive a file comprising the ACH item and to communicate with a screening module. The screening module can be operable to determine whether the sending customer, the receiving customer, or both the sending customer and the receiving customer, are identified on the interdiction list. Depending on the result of that determination, the screening module can be operable to insert into the file one of two indicators, the first indicator indicating that at least one of the customers is identified on the interdiction list and the second indicator indicating that neither of the customers is identified on the interdiction list. The system can further comprise a list of false positives, which can be accessed by the screening module when determining whether the customers are identified on the interdiction list. In addition, the gateway operator can be further operable to transmit the screened file to either a second gateway operator or a receiving depository institution.

Yet another aspect of the present invention provides a method for screening an ACH item. A financial institution can identify a party in the ACH item and compare information about the party to information in an interdiction list. If the information about the party does not match the information in the interdiction list, the financial institution can associate a first indicator with the ACH item. If the information about the party matches the information in the interdiction list, the financial institution can compare the information about the party to a false positives list. If the information about the party does not match information in the false positives list, the financial institution can associate a second indicator with the ACH item. If the information about the party matches information in the false positives list, the financial institution can associate a third indicator with the ACH item. The party can be a sending party or a receiving party. The information in the interdiction list can be a name, address, bank account number, social security number, and/or any other type of identifying information. The list of false positives can be stored in a local database or a remote database.

The discussion of screening financial transactions presented in this summary is for illustrative purposes only. Various aspects of the present invention can be more clearly understood and appreciated from a review of the following detailed description of the disclosed embodiments and by reference to the drawings and claims.

BRIEF DESCRIPTION OF THE DRAWINGS

FIG. 7 is a flow diagram illustrating a method for screening an outbound item according to an exemplary embodiment of the present invention.

FIGS. 8A and 8B are flow diagrams illustrating a method for screening an inbound item according to an exemplary embodiment of the present invention.

FIGS. 9A and 9B are flow diagrams illustrating a method for screening an outbound item according to an exemplary embodiment of the present invention.

DETAILED DESCRIPTION

Figure 1:
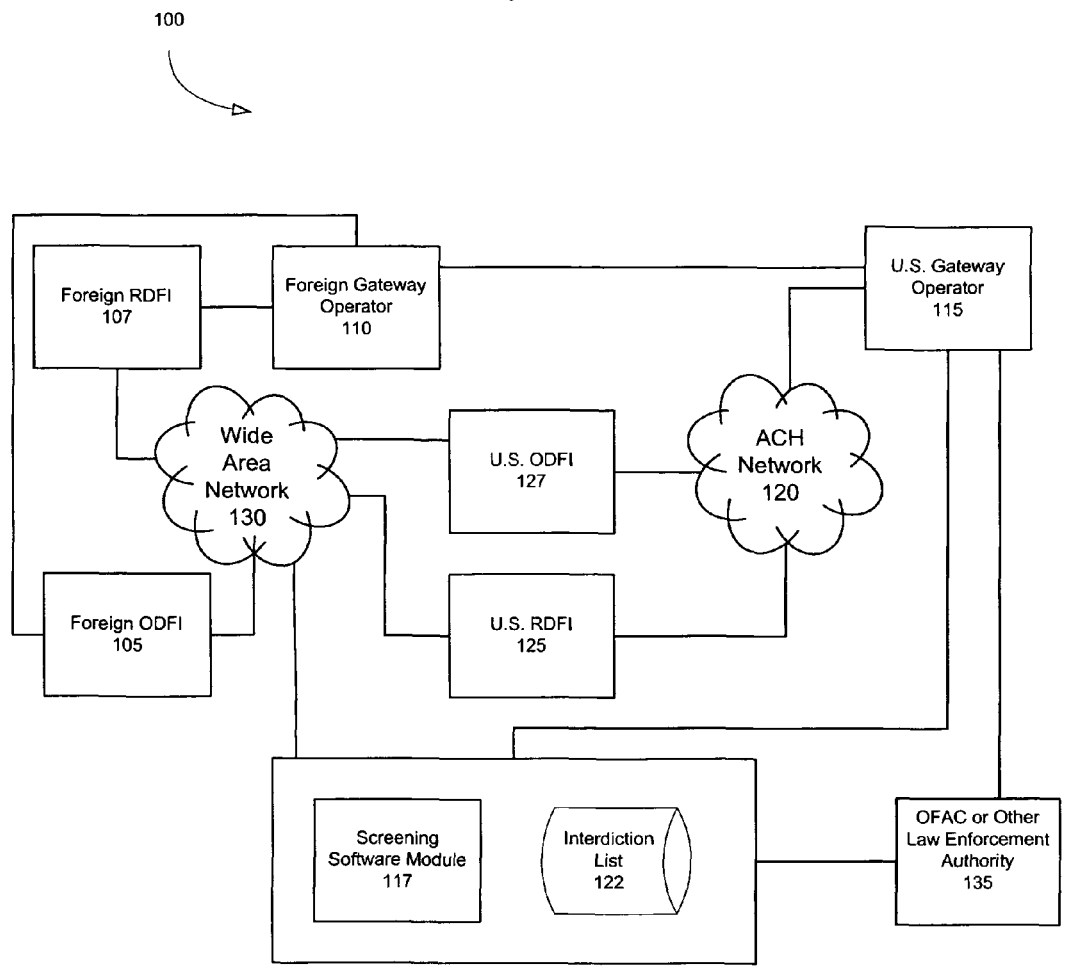
FIG. 1 is a block diagram illustrating an architecture for implementing screening of financial transactions according to an exemplary embodiment of the present invention.

The present invention is directed to a system and method for screening financial transactions. In one exemplary embodiment, a U.S. gateway operator ("USGO"), a financial institution that serves as a central clearing facility through which other financial institutions transmit or receive ACH items and/or ACH files, can use a screening software module to screen ACH items. The screening software module can be coupled to one or more databases of false positives used to minimize screening errors. The USGO can screen ACH items originating at U.S. financial institutions and at foreign financial institutions. Although the exemplary embodiments described herein are in the context of screening international financial transactions, the invention can also be implemented in a domestic screening environment. The USGO can insert an indicator into the electronic file of the ACH item to identify the ACH item as having been screened. The indicator can identify whether the screening produced a match against an interdiction list and/or whether the screening produced a false positive. The one or more false positives databases provide for a more efficient screening process.

The present invention can be implemented in a variety of different embodiments. In one embodiment, the screening software module can screen each ACH item, insert into the ACH file comprising the ACH item an indicator associated with the screening, and forward the ACH item to the receiving financial institution. In another embodiment, the screening software module can suspend processing of an ACH item and/or return the ACH item to the originating financial institution when the screening software module produces a match with a party on an interdiction list. In yet another embodiment, originating financial institutions can access the screening software module, either locally or remotely, to perform screening before transmitting ACH items to the ACH network. These and other embodiments of the invention will be described below in connection with the drawing set.

FIG. 1 illustrates an exemplary architecture 100 for implementing a method and system for screening financial transactions. Specifically, the architecture 100 comprises U.S. and foreign financial institutions that clear financial transactions through an international ACH network. For example, a foreign originating depository financial institution ("ODFI") 105 can originate a financial transaction that is transmitted to a U.S. receiving depository financial institution ("RDFI") 125 by way of clearing through the ACH network 120. Alternatively, a U.S. ODFI 127 can transmit an ACH item through the ACH network 120 to a foreign RDFI 107.

Figure 10:
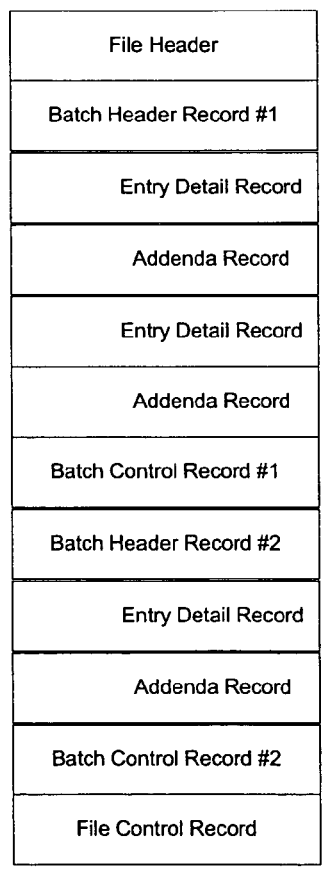
FIG. 10 is a block diagram illustrating a file structure in accordance with an exemplary embodiment of the present invention.

As set forth above, the terms "financial transaction," "transaction," "ACH transaction," "ACH item," and "item" are used interchangeably herein to refer to any batched processed electronic payment, whether international or domestic. The terms "ACH file," "electronic file," and "file" are used interchangeably herein to refer to any collection of batched and/or unbatched ACH items. Typically, an ACH file is in the NACHA file format. The fields that generally constitute a NACHA file are illustrated in the exemplary file structure illustrated in FIG. 10. Other suitable file formats and file fields will be apparent to those of skill in the art.

The foreign ODFI 105 can transmit a file containing ACH items to a foreign gateway operator 110. The foreign gateway operator 110 can transmit the file to the USGO 115. In one embodiment of the present invention, the foreign gateway operator 110 can convert the file from a format used in the foreign country to a format used in the U.S., such as the NACHA format, prior to transmitting the file to the USGO 115. Certain exemplary methods and systems for conducting such a file format conversion are described in co-pending U.S. patent application Ser. No. 10/868,729, which is co-owned by the present assignee and incorporated herein by reference in its entirety. The USGO 115 can edit the received file, e.g., to correct errors in the file format and/or to fill all required fields, and transmit it to the U.S. RDFI 125 via the ACH network 120. In alternate embodiments of the present invention, the foreign financial institutions can also use a clearinghouse (not shown in FIG. 1) to route items to the foreign gateway operator 110.

In one embodiment of the present invention, the foreign ODFI 105 can perform screening operations on each ACH item in the ACH file to determine whether the sender or recipient of the transaction is on an interdiction list 122. The interdiction list 122 comprises information identifying certain persons (or entities) who are prohibited from conducting certain financial transactions. A person can be identified on an interdiction list 122, for example, because he/she is a credit risk. Typically, the interdiction list 122 is used to identify criminals and to prevent them from completing international financial transactions. For example, the U.S. Treasury Department's Office of Foreign Assets Control ("OFAC") 135 maintains and regularly updates an interdiction list 122 (commonly referred to as the "SDN List") of "Specially Designated Nationals and Blocked Persons." OFAC 135 administers economic sanctions and embargo programs that require assets and transactions involving interests of persons identified on the SDN List be frozen.

The interdiction list 122 can comprise portions of OFAC's SDN List and/or another list of specially identified persons, and it can be stored and/or maintained by OFAC 135, the USGO 115, or any other suitable entity. For example, the interdiction list 122 can be a copy of OFAC's SDN List that is stored and maintained by the USGO 115. In one embodiment of the present invention, there can be multiple interdiction lists 122. For example, the interdiction list 122 can comprise an interdiction list 122 for each financial institution. When screening an ACH item for a particular financial institution, the screening entity can access that financial institution's interdiction list 122.

Regardless of whether the foreign ODFI 105 performs any screening on the ACH items, the USGO 115 can use screening software module 117 to screen the ACH items in a file that it receives. The screening software module 117 can analyze each ACH item in the file and determine whether the sender or recipient is identified on the interdiction list 122. The screening software module 117 can also analyze text messages in an addenda attached to the ACH item for names or other information matching names or other information on the interdiction list 122. If there is a match with a name and/or other information on the interdiction list 122, including e.g., an address, telephone number, social security number, or bank account number, the screening software module 117 can place an indicator in the ACH file associated with the ACH item. For example, the screening software module 117 can place an indicator in a field of the ACH file. The indicator can alert the U.S. RDFI 125 and the foreign ODFI 105 that the sender or recipient of the ACH item is identified on the interdiction list 122. A match with the interdiction list 122 also can trigger the USGO 115 to notify OFAC 135 or other law enforcement authorities 135. For example, the screening software module 117 can transmit an email to the authorities 135, post a notice at a secure web site, and/or send a copy of the ACH item or file to the authorities (or another designated person or entity). Before sending a copy of the ACH item or file, the screening software module 117 can reformat the ACH item/file according to the file format capabilities of the authorities. For example, the screening software module 117 can reformat the ACH item/file from the NACHA file format to another file format that is familiar to the authorities.

In certain embodiments of the present invention, if there is a match, the USGO 115 can suspend processing of the ACH item and reject the ACH item back to the originating financial institution. In rejecting the ACH item back, the USGO 115 can send the ACH item or a copy of the ACH item to the originating financial institution or it can send a notice of the match with a request for instructions regarding whether to continue processing the ACH item. In alternative embodiments, the USGO 115 can suspend processing of, and reject back to the originating financial institution, the whole file or portions thereof.

In response to a rejection, the originating financial institution can check for additional information to determine whether the ACH item/file should be processed. For example, the originating financial institution can compare its records to the interdiction list 122 to determine whether the match was a false positive. If the originating financial institution determines that the ACH item/file should be processed, it can either resubmit the ACH item/file to the USGO 115 or send instructions to the USGO 115 to continue processing the ACH item/file. In one embodiment of the present invention, depending on the time by which the U.S. ODFI 127 provides such instructions to the USGO 115, the ACH item can be processed in its original file or in a new file. For example, if the U.S. ODFI 127 submits instructions to the USGO 115 by the end of the processing day on which the ACH item was rejected, the ACH item can be included in the original file. If the instructions are submitted after that processing day, the ACH item can be sent in a new file.

In alternative embodiments of the present invention other entities can perform the USGO's 115 screening functions. For example, the foreign gateway operator 110 or the domestic or foreign financial institutions can access the screening software module 117 via wide area network 130. The financial institutions can access the screening software module 117 to perform their own screening procedures on ACH items.

Those skilled in the art will appreciate that exemplary architecture 100 is merely representative of the components for performing screening operations on international financial transactions. For example, the USGO 115 can use the screening software module 117 to automatically notify the originating financial institution, OFAC 135, and/or other law enforcement authorities 135 that a potential match to the interdiction list 122 has been identified and that the receiving financial institution has been notified of the potential match. Other embodiments of the present invention can not have all of the components identified in FIG. 1 or can include other components.

Figure 2:
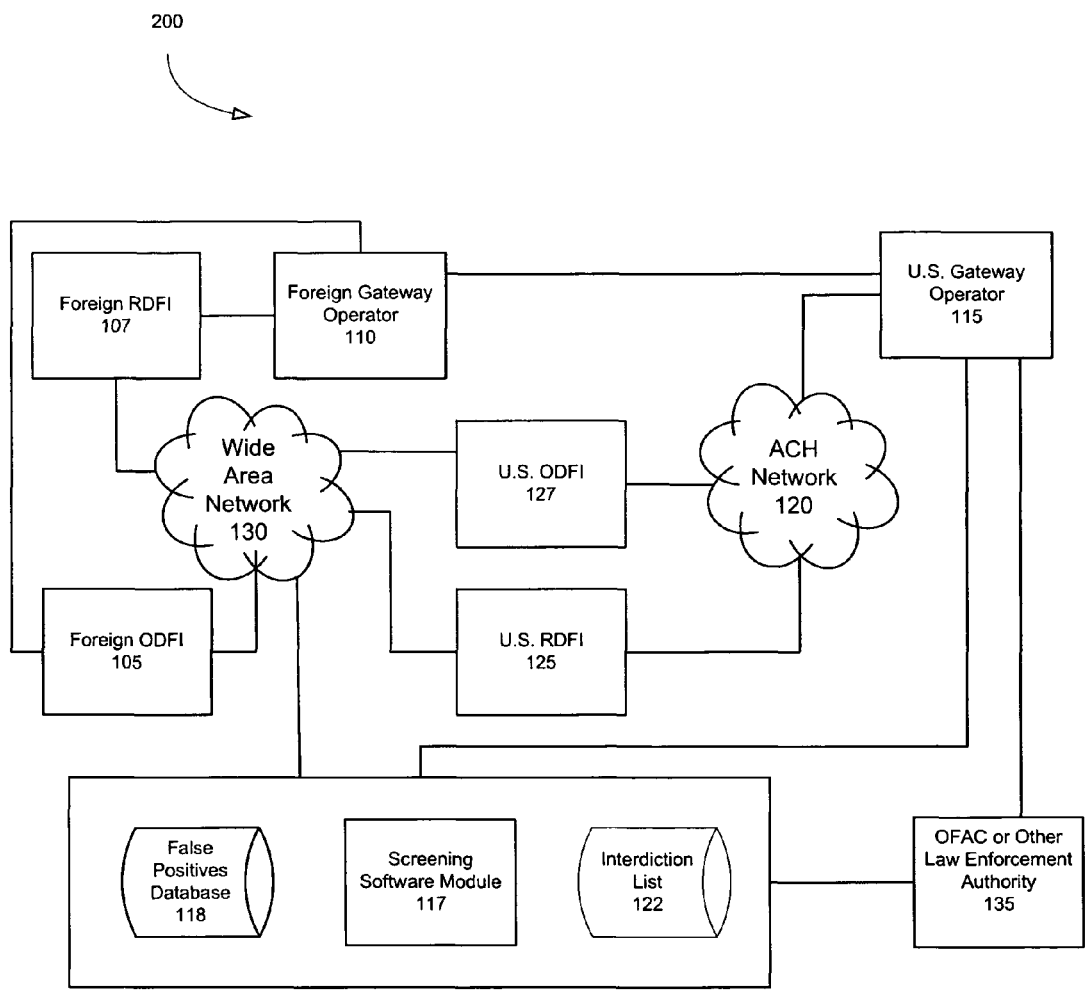
FIG. 2 is a block diagram illustrating an architecture for implementing screening of financial transactions according to an alternative exemplary embodiment of the present invention.

FIG. 2 illustrates an alternative exemplary architecture 200 for implementing a method and system for screening financial transactions. As in FIG. 1, the architecture 200 comprises U.S. and foreign financial institutions that clear financial transactions through an international ACH network. The USGO 115 maintains a database of false positives 118. The false positives database 118 comprises information about individuals with the same or similar names, addresses, and/or other identifying information, to those persons identified on the interdiction list 122. The false positives database 118 can be populated by the USGO 115 and/or by other financial institutions via the wide area network 130. The other financial institutions often will have additional information about the senders and recipients of the financial transactions that they can use to populate the false positives database 118. The information in the false positives database 118 can be used e.g., by the screening software module 117, to reduce the number of false positives and thus make the screening process more efficient. The false positives database 118 also can serve as a resource of information for the law enforcement authorities 135.

Those skilled in the art will appreciate that exemplary architecture 200 is merely representative of the components for performing screening operations on international financial transactions. Other embodiments of the present invention can not have all of the components identified in FIG. 2 or can include other components.

Figure 3:
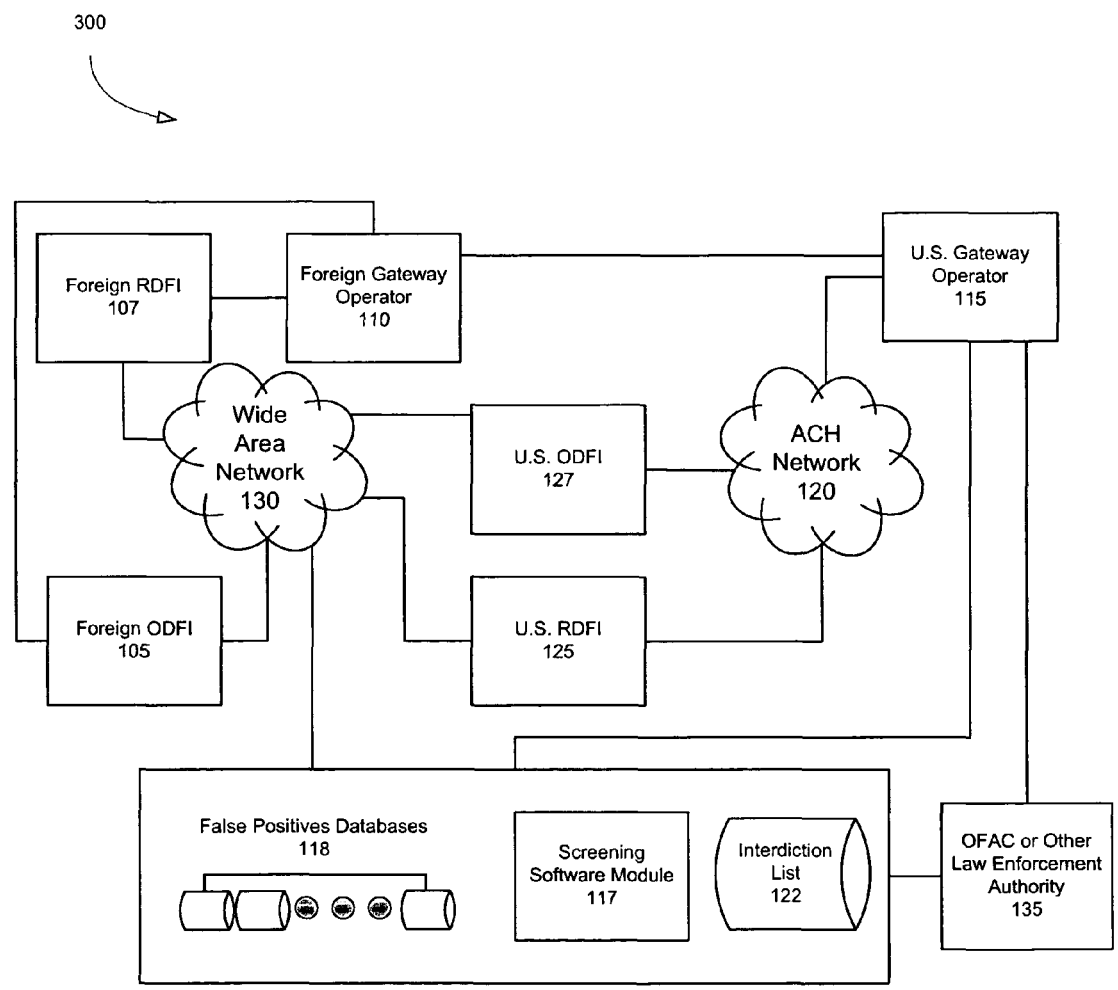
FIG. 3 is a block diagram illustrating an architecture for implementing screening of financial transactions according to an alternative exemplary embodiment of the present invention.

FIG. 3 illustrates an alternative exemplary architecture 300 for implementing a method and system for screening financial transactions. As in FIGS. 1 and 2, the architecture 300 comprises U.S. and foreign financial institutions that clear financial transactions through an international ACH network. The USGO 115 maintains a plurality of false positives databases 118. Each of the false positives databases 118 is associated with a financial institution. When screening ACH items for a particular financial institution, the screening software module 117 can access that financial institution's false positives database 118 to prevent known false positives from being rejected. The false positives databases 118 can be populated by the USGO 115 and/or by other financial institutions via the wide area network 130.

Those skilled in the art will appreciate that exemplary architecture 300 is merely representative of the components for performing screening operations on international financial transactions. For example, each of the false positives databases 118 can be separately stored and maintained by the financial institution with which it is associated. By separately storing and maintaining the false positives databases 118, the financial institutions can more effectively protect the confidentiality of their account holders' private information. Other embodiments of the present invention can not have all of the components identified in FIG. 3 or can include other components.

Figure 4:
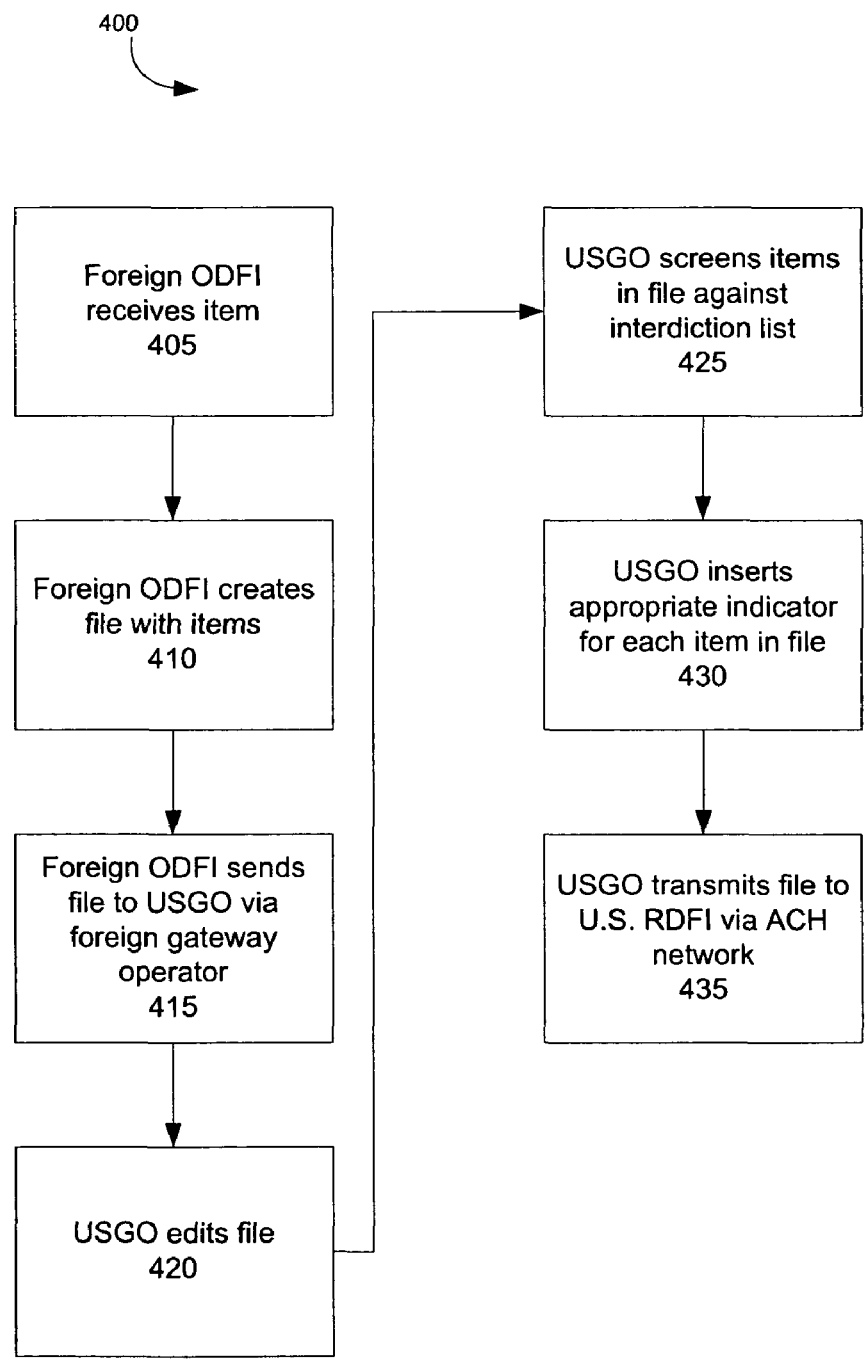
FIG. 4 is a flow diagram illustrating a method for screening an inbound item according to an exemplary embodiment of the present invention.

FIG. 4 illustrates an exemplary process 400 for screening financial transactions sent from a foreign financial institution to a U.S. institution. The exemplary process 400 is merely illustrative and, in alternative embodiments of the invention, certain steps can be performed in a different order or omitted entirely. In the exemplary process 400 illustrated in FIG. 4, the foreign financial institution does not perform any screening on the transactions.

In step 405, the foreign ODFI 105 receives a financial transaction and creates an ACH item for the financial transaction. In step 410, the foreign ODFI 105 packages a group of batched and/or unbatched ACH items in an ACH file. In alternative embodiments of the present invention, the ACH file can contain a single ACH item. Additionally, the foreign ODFI 105 can receive ACH files comprising one or more ACH items from other financial institutions. In step 415, the foreign ODFI 105 sends the ACH file to the USGO 115 via the foreign gateway operator 110. Although not illustrated in exemplary process 400, the transmission of the ACH file from the foreign gateway operator to the USGO typically involves a conversion process from one file format to another file format.

In step 420, the USGO 115 edits the received ACH file, e.g., to correct errors in the file format and/or to fill all required fields. Next, in step 425, the USGO 115 uses the screening software module 117 to screen the ACH items in the ACH file against one or more interdiction lists 122. Depending on the results of the screening operations, the screening software module 117 inserts an appropriate indicator into the ACH file in step 430. For example, if neither the sender of an ACH item nor the recipient of the ACH item is identified on the interdiction list 122, a first indicator can be used. However, if either or both of the sender of the ACH item and the recipient of the ACH item is identified on the interdiction list 122, a second type of indicator can be inserted for that ACH item in the ACH file. For example, a "0" can be placed into the ACH file if there is not a match, and a "1" can be placed into the ACH file if there is a match.

Although not shown in FIG. 4, in alternative embodiments of the present invention, a match can trigger the USGO 115 to send a notice of the match and/or a copy of the ACH item or ACH file to the foreign ODFI 105, OFAC 135, and/or other law enforcement authorities 135. Before sending a copy of the ACH item or file, the USGO 115 can reformat the ACH item/file according to the file format capabilities of the foreign ODFI 105, OFAC 135, and/or other law enforcement authorities 135. For example, the USGO 115 can reformat the ACH item/file from the NACHA file format to another file format that is familiar to the foreign ODFI 105, OFAC 135, and/or other law enforcement authorities 135. Once each ACH item in the ACH file is screened, the USGO 115 transmits the ACH file to the U.S. RDFI 125 via the ACH network 120, in step 435.

Figure 5:
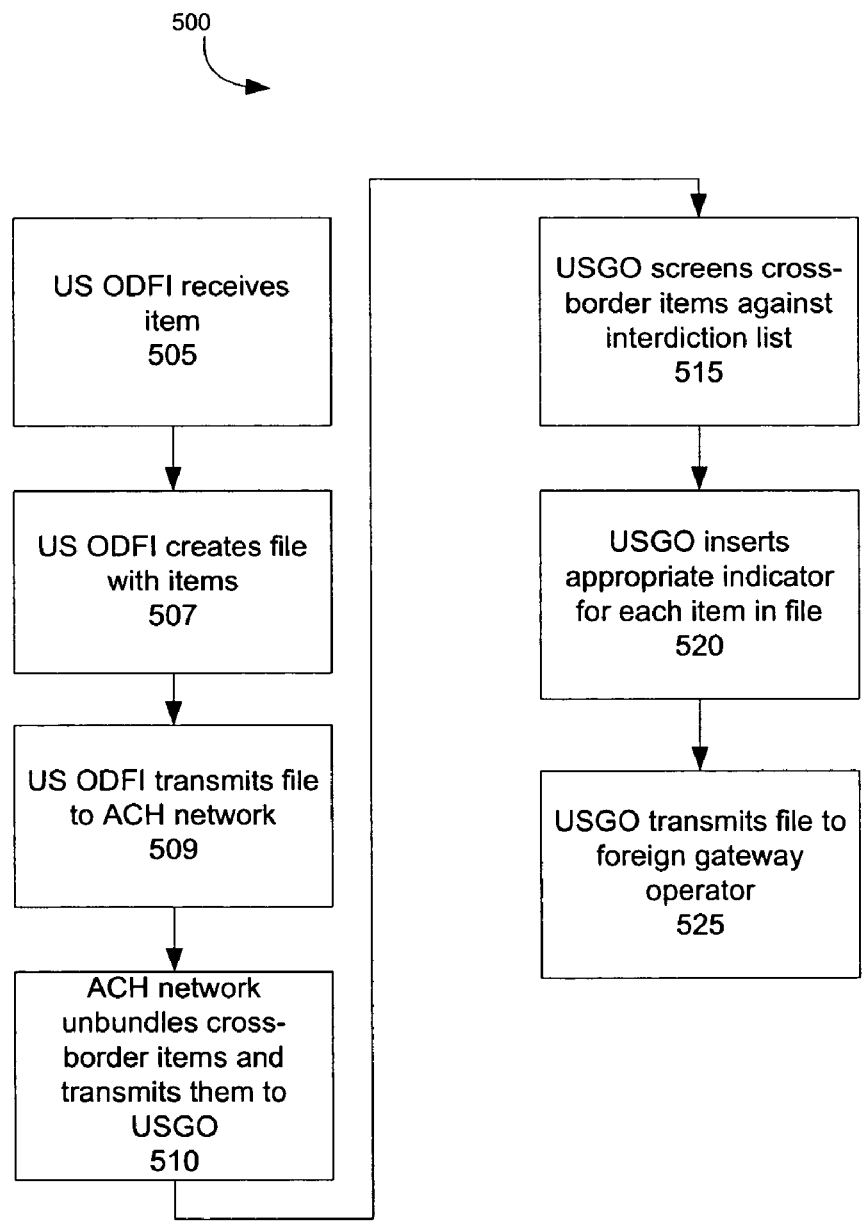
FIG. 5 is a flow diagram illustrating a method for screening an outbound item according to an exemplary embodiment of the present invention.

FIG. 5 illustrates an exemplary process 500 for screening a transaction item transmitted from the U.S. ODFI 127 to the foreign RDFI 107. The exemplary process 500 is merely illustrative and, in alternative embodiments of the invention, certain steps can be performed in a different order or omitted entirely. The exemplary process 500 begins at step 505 where the U.S. ODFI 127 receives a financial transaction and creates an ACH item for the financial transaction. In step 507, the U.S. ODFI 127 packages a group of batched and/or unbatched ACH items in an ACH file. In alternative embodiments of the present invention, the ACH file can contain a single ACH item. Additionally, the U.S. ODFI 127 can receive ACH files comprising one or more ACH items from other financial institutions. Typically, the ACH file is in the NACHA file format. Other suitable file formats will be apparent to those of skill in the art.

In step 509, the U.S. ODFI 127 transmits the file to the ACH network 120. Although the U.S. ODFI 127 does not perform any screening on the ACH item before sending it to the USGO 115 in the exemplary process 500, in alternative embodiments of the present invention, the U.S. ODFI 127 can perform screening operations on the ACH item. In step 510, the ACH network 120 unbundles cross-border (international) items from the ACH file and transmits them to the USGO 115. In step 515, the USGO 115 uses the screening software module 117 to screen the cross-border items against the interdiction list 122.

Depending on the results of the screening operations, the screening software module 117 inserts an appropriate indicator into the ACH file in step 520. For example, if neither the sender of an ACH item nor the recipient of the ACH item is identified on the interdiction list 122, a first indicator can be used. However, if the either or both of the sender of the ACH item and the recipient of the ACH item is identified on the interdiction list 122, a second type of indicator can be inserted for that ACH item in the ACH file. For example, a "0" can be placed into the ACH file if there is not a match, and a "1" can be placed into the ACH file if there is a match.

Although not shown in FIG. 5, in alternative embodiments of the present invention, a match can trigger the USGO 115 to send a notice of the match and/or a copy of the ACH item or ACH file to OFAC 135 or other law enforcement authorities 135. Before sending a copy of the ACH item or file, the USGO 115 can reformat the ACH item/file according to the file format capabilities of OFAC 135 or the other law enforcement authorities 135. For example, the USGO 115 can reformat the ACH item/file from the NACHA file format to another file format that is familiar to OFAC 135 or the other law enforcement authorities 135. Once each ACH item in the file is screened, the USGO 115 transmits the ACH file to the foreign gateway operator 110, in step 525.

Figure 6:
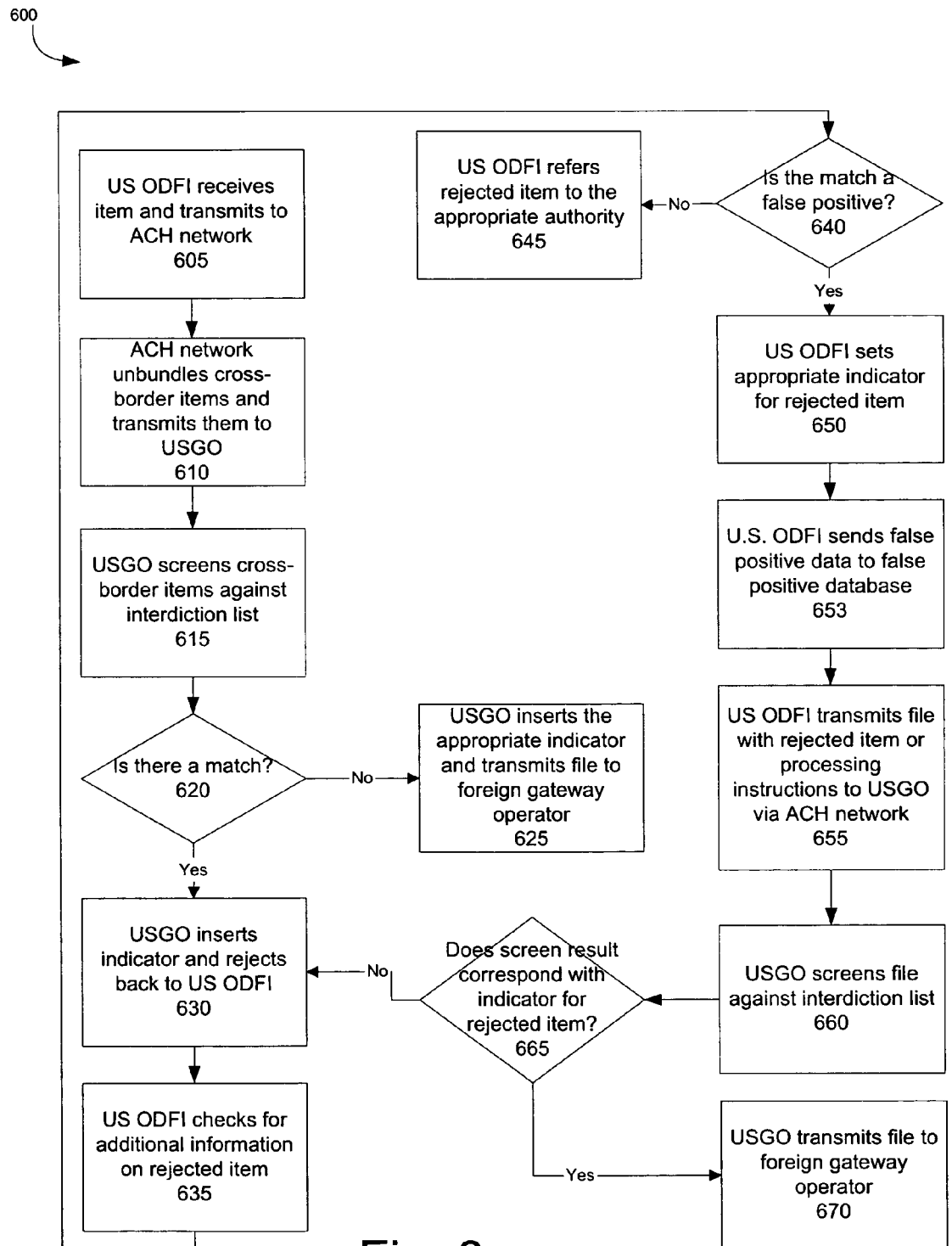
FIG. 6 is a flow diagram illustrating a method for screening an outbound item according to an exemplary embodiment of the present invention.

An alternative embodiment of exemplary process 500 is illustrated as exemplary process 600 in FIG. 6. FIG. 6 illustrates an exemplary process 600 for screening an ACH item transmitted from the U.S. ODFI 127 to the foreign RDFI 107 using a false positives database 118 to filter out matches that are false positives.

The exemplary process 600 begins at step 605 where the U.S. ODFI 127 receives one or more ACH items and transmits the ACH item(s) in an ACH file via the ACH network 120. The ACH item comprises information about a financial transaction and can be received from a customer or another financial institution. Although the U.S. ODFI 127 does not perform any screening on the ACH item before sending it to the USGO 115 in the exemplary process 600, in alternative embodiments of the present invention, the U.S. ODFI 127 can perform screening operations on the ACH item. In step 610, the ACH network 120 unbundles cross-border (international) ACH items from the ACH file and transmits them to the USGO 115. In step 615, the USGO 115 uses the screening software module 117 to screen the cross-border items against the interdiction list 122. In one embodiment of the present invention, the screening software module 117 can access the false positives database 118 during step 615 to automatically filter out known false positives, thereby preventing those false positives from being reported as matches.

If the screening software module 117 does not find a match in step 620, the USGO 115 can insert an appropriate indicator and transmit the ACH file to the foreign gateway operator 110 in step 625. If the screening software module 117 finds a match on the interdiction list 122 in step 620, the USGO 115 suspends processing of the ACH item, inserts an appropriate indicator into the ACH file of the ACH item, and rejects the item back to the U.S. ODFI 127 in step 630. In rejecting the item back to the U.S. ODFI 127, the USGO 115 can send the ACH item or a copy of the ACH item back to the U.S. ODFI 127. Alternatively, the USGO 115 can send a notice of the match to the U.S. ODFI 127 with a request for instructions regarding whether to continue processing the ACH item. In alternative embodiments, the USGO 115 can suspend processing of, and reject back to the U.S. ODFI 127, the whole ACH file or portions thereof.

Although not shown in FIG. 6, in alternative embodiments of the present invention, a match can trigger the USGO 115 to send a notice of the match and/or a copy of the item or file to OFAC 135 or other law enforcement authorities 135. Before sending a copy of the ACH item or file, the USGO 115 can reformat the ACH item/file according to the file format capabilities of OFAC 135 or the other law enforcement authorities 135. For example, the USGO 115 can reformat the ACH item/file from the NACHA file format to another file format that is familiar to OFAC 135 or the other law enforcement authorities 135.

The U.S. ODFI 127 performs additional checks on the rejected ACH item in step 635 to determine if the match is a false positive. The U.S. ODFI 127 often will have additional information about the originator of the ACH item and the intended recipient. That additional information, such as an address, social security number, or birth date, can establish that the sender or recipient actually is not the person identified on the interdiction list 122. If the U.S. ODFI 127 is unable to validate the ACH item in step 640, it can refer the rejected ACH item to the appropriate authorities for further investigation in step 645. If, in step 640, the U.S. ODFI 127 determines that the match is a false positive, it can insert an appropriate indicator into the ACH file containing the ACH item in step 650. In step 653, the U.S. ODFI 127 can send false positive data, including e.g., the name, address, social security number, and/or bank account number, of the falsely identified person, to the false positives database 118. Thereafter, the screening software module 117 and/or the screening entity can use that false positive data to prevent inappropriate processing suspensions and rejections.

If, in rejecting the item back to the U.S. ODFI 127 in step 630, the USGO 115 sent the ACH item or a copy of the ACH item to the U.S. ODFI 127, in step 655, the U.S. ODFI 127 can send the rejected ACH item in a new ACH file to the USGO 115 over the ACH network 120. If there are other items in the ACH file, the ACH network 120 can unbundle the cross-border ACH items, as in step 610. Alternatively, if, in rejecting the item back to the U.S. ODFI 127 in step 630, the USGO 115 sent the U.S. ODFI 127 a notice of the match, in step 655, the U.S. ODFI 127 can submit instructions to the USGO 115 to continue processing the rejected ACH item. In one embodiment of the present invention, depending on the time by which the U.S. ODFI 127 provides such instructions to the USGO 115, the ACH item can be processed in its original ACH file or in a new ACH file. For example, if the U.S. ODFI 127 submits instructions to the USGO 115 by the end of the processing day on which the ACH item was rejected, the ACH item can be included in the original ACH file. If the instructions are submitted after that processing day, the ACH item can be sent in a new ACH file.

In step 660, the USGO 115 again screens the ACH items in the ACH file against the interdiction list 122 using the screening software module 117. If, in step 665, the screening software module 117 finds a screening result that does not correspond with the previous indicator, the USGO 115 will insert the new indicator and reject the ACH item back to the U.S. ODFI 127 in step 630. Alternatively, if the screening software module 117 does not identify any new matches against the interdiction list 122, the USGO 115 can transmit the ACH file to the foreign gateway operator 110 in step 670.

Another alternative embodiment of exemplary process 500 is illustrated as exemplary process 700 in FIG. 7. Exemplary process 700 provides a method for the U.S. ODFI 127 to perform an initial screen on all ACH items before sending the ACH items to the USGO 115. Exemplary process 700 is merely illustrative and in alternative embodiments of the invention certain steps can be performed in a different order or omitted entirely.

Beginning with step 705 where the U.S. ODFI 127 receives an ACH item, the U.S. ODFI 127 can access the screening software module 117 to screen the ACH item against the interdiction list 122 in step 710. The U.S. ODFI 127 can access the screening software module 117 in a variety of ways. For example, in the exemplary embodiments described in connection with FIGS. 1, 2, and 3, the U.S. ODFI 127 can access the screening software module 117 over the wide area network 130. Alternatively, the U.S. ODFI 127 can receive a copy of the screening software to perform its own local screening procedure.

If the screening software module 117 identifies a match in step 715, the U.S. ODFI 127 will attempt to determine whether the match is a false positive in step 720. For example, the U.S. ODFI 127 can compare information about the person on the interdiction list 122 with information about the sender or recipient of the ACH item. If the U.S. ODFI 127 is unable to validate the ACH item, it will refer the ACH item to the appropriate authorities for further investigation in step 725. If the U.S. ODFI 127 is able to validate the ACH item, it will insert an appropriate indicator for the ACH item in the ACH file. The indicator can identify whether no match was found and/or whether there was a false positive match found.

Though not illustrated in FIG. 7, if the match is deemed a false positive, the U.S. ODFI 127 can send false positive data to the false positives database 118. Thereafter, the screening software module 117 and/or the screening financial institution can use that false positive data to prevent inappropriate processing suspensions and rejections. In step 730, the U.S. ODFI 127 transmits the ACH file comprising the ACH item to the ACH network 120 and, in step 733, the ACH network 120 unbundles the cross-border ACH items from the ACH file and forwards them to the USGO 115.

When the USGO 115 receives a file, in step 735, it screens each cross-border ACH item in the file against the interdiction list 122 using the screening software module 117. If the screening software module 117 finds any matches with the interdiction list 122, the software module 117 compares the match to the indicator that the U.S. ODFI 127 previously inserted. For example, if the screening software module 117 finds a match for the intended recipient of the ACH item, the screening software module 117 compares this match to the indicator the U.S. ODFI 127 previously inserted in step 730. In the pre-screening process, the U.S. ODFI 127 can have identified the intended recipient and determined that the match was a false positive based on additional information about the intended recipient. The indicator will identify any such matches that the U.S. ODFI 127 determined to be false positives. If the match corresponds with the U.S. ODFI indicator in step 740, the USGO 115 transmits the ACH file comprising the ACH items to the foreign gateway operator 110 in step 745. However, if the screening software module 117 finds a new match or a match that does not correspond with the ODFI indicator, the USGO 115 inserts the appropriate indicator and rejects the item back to the U.S. ODFI 127 in step 750. Exemplary process 700 then follows the steps illustrated from step 635 forward in FIG. 6.

The exemplary process 800 illustrated in FIGS. 8A and 8B presents another method for screening an international financial transaction. Exemplary process 800 is merely illustrative and in alternative embodiments of the invention certain steps can be performed in a different order or omitted entirely.

The foreign ODFI 105 receives an ACH item in step 805 and screens the ACH item against the interdiction list 122 in step 810. The foreign ODFI 105 can screen items using screening software module 117. The foreign ODFI 105 can access the screening software module 117 via the wide area network 130 or can receive a copy of the screening software module 117 for local screening processes. If the foreign ODFI 105 does not find a match in step 815, it can insert an appropriate indicator, for example a "0" indicator, for the ACH item in step 820. Alternatively, if the screen against the interdiction list 122 produces a match, the foreign ODFI 105 can check for additional information in step 825 to determine whether the match is a false positive.

If the match is not a false positive in step 830, the foreign ODFI 105 will not send the ACH item in step 835. If the foreign ODFI 105 is able to determine that the match is a false positive in step 830, it can insert an indicator into the ACH file comprising the ACH item. For example, in step 840, the foreign ODFI 105 can insert a "1" to indicate that the sender was a false positive, a "2" to indicate that the intended recipient is a false positive, or a "3" to indicate that both parties were false positives. The indicator also can indicate if false positive information is available in an addenda file or has been sent to the false positives database 118. Alternatively, in step 840, the foreign ODFI 105 can insert a "1" simply to indicate that the item produced a match with the interdiction list 122, regardless of whether that match was a false positive. In step 845, the foreign ODFI 105 can send false positive data to the false positives database 118 over the wide area network 130. For example, the foreign ODFI 105 can send address information for a party that it determined was a false positive to the database for reference by the USGO 115. In one embodiment of the present invention, the false positive data can be included in the ACH file comprising the ACH item.

In step 850, the foreign ODFI 105 transmits the ACH item in the ACH file to the USGO 115 via the foreign gateway operator 110. Although not illustrated in exemplary process 800, step 850 typically includes a conversion process from the foreign file format to the NACHA file format used in the U.S. In step 855, the USGO 115 screens the ACH items in the ACH file against the interdiction list 122 using the screening software module 117. Although not illustrated in exemplary process 800, prior to screening the ACH items in the ACH file, the USGO 115 can edit the transmitted ACH file, e.g., to correct errors in the file format and/or to fill all required fields. If the screening software module 117 does not identify a match in step 860, the USGO 115 can send the file to the ACH network 120 in step 870. If the screening software module 117 identifies a match for an ACH item on the interdiction list 122 in step 860, exemplary process 800 proceeds to step 875 in FIG. 8B.

In step 875, the screening software module 117 compares the suspect ACH item to information in the false positives database 118. If the USGO 115 is able to determine that the match is a false positive, in step 877, based on the data in the database 118, the USGO 115 can send the ACH file comprising the ACH item to the U.S. RDFI 125 in step 880. If the USGO 115 is unable to verify that the match is a false positive from information in the database 118, the USGO 115 can suspend the ACH item for further investigation. In step 882, the USGO 115 removes the suspect ACH item from the ACH file. In step 885, the USGO 115 reformats the ACH file with the remaining ACH items and send the ACH file to the U.S. RDFI 125. The USGO 115 credits the suspect ACH item to a temporary account in step 887 and refers the ACH item to the law enforcement authorities 135 for further investigation in step 890.

In connection with the referral of the ACH item to law enforcement authorities 135, the USGO 115 can also send a notice to the ODFI 105 and the U.S. RDFI 125 in step 892. The notice that the suspect item has been suspended can be in the form of an email, a posting at a secure web site, or an ACH message item, for example. If the law enforcement authority 135 is able to clear the suspect item, the USGO 115 can receive a notice and transmit the suspended ACH item to the U.S. RDFI 125 in steps 895 and 896. Alternatively, if the suspect ACH item is not cleared in step 894, the law enforcement authority 135 handles the disposition of the suspect item in step 898.

The exemplary process 900 illustrated in FIGS. 9A and 9B presents an alternative method for screening a financial transaction transmitted from a U.S. financial institution to a foreign financial institution. Exemplary process 900 is merely illustrative and in alternative embodiments of the invention certain steps can be performed in a different order or omitted entirely. Referring to step 905, the U.S. ODFI 127 receives a financial transaction and creates an ACH item comprising information about the financial transaction. In step 910, the U.S. ODFI 127 screens the item against the interdiction list 122. The screening can be performed using the screening software module 117 as illustrated in the exemplary process 700 of FIG. 7. Alternatively, the U.S. ODFI 127 can use its own software and methods to screen the item.

If it is determined in step 915 that there is no match on the interdiction list, the U.S. ODFI 127 inserts an appropriate indicator, for example a "0" indicator, into the ACH file comprising the ACH item in step 920. Alternatively, if the U.S. ODFI 127 identifies a match, it can check for additional information to determine whether the match is a false positive in step 925. For example, the financial institution can check the sender or intended recipient's address to see if that also matches the information on the interdiction list 122. If the U.S. ODFI 127 is unable to determine that the match is a false positive in step 925, it will not send the ACH item on to the USGO 115 in step 935. Typically, the financial institution would refer such an ACH item to an appropriate authority for further investigation.

If the U.S. ODFI 127 is able to determine that the match is a false positive in step 930, it will insert the appropriate indicator for the item in step 940. For example, the indicator can indicate that the match was a false positive for the sender, the recipient, or both. The U.S. ODFI 127 will also send the information it relied upon to make the false positive determination to the false positives database 118 in step 945. Later, the USGO 115 will be able to access the false positive information in the database 118. In one embodiment of the present invention, the U.S. ODFI 127 can transmit the false positive information in the ACH file comprising the ACH item. Distinct indicators can be used when false positive information is transmitted with the ACH item or provided to the false positives database 118.

The U.S. ODFI 127 sends the file comprising one or more ACH items to the ACH network 120 in step 950. The ACH network 120 unbundles the cross-border ACH items from the ACH file in step 953 and transmits the cross-border ACH items to the USGO 115. In step 955, the USGO 115 uses the screening software module 117 to screen the ACH items in the ACH file against the interdiction list 122. If the parties to the ACH items (e.g., the sending and receiving customers) are not identified on the interdiction list 122, the USGO 115 will send the ACH file to the foreign gateway operator 110 in step 965. If any of the parties to the ACH items are identified on the interdiction list 122 in step 960, exemplary process 900 proceeds to step 975 in FIG. 9B.

In step 975, the screening software module 117 compares the suspect ACH item to the additional information in the false positives database 118. If the USGO 115 is able to verify that the match is a false positive, it will send the ACH file to the foreign gateway operator 110 in step 980. However, if the USGO 115 is unable to determine that the match is a false positive, it will suspend the ACH item for further investigation. In step 982, the USGO 115 unbatches the suspect ACH item from the ACH file. In step 985, the USGO reformats the ACH file with the remaining ACH items and sends the reformatted ACH file to the foreign gateway operator 110. In step 987, the USGO 115 credits the suspect ACH item to a temporary account and refers the ACH item to the appropriate authorities for further investigation in step 990.

The ODFI 127 and RDFI 107 receive notice that the suspect ACH item is suspended from the USGO 115 in step 992. If the law enforcement authorities 135 are not able to clear the suspect item in step 994, they will handle the disposition of the ACH item in step 998. Alternatively, if the law enforcement authorities 135 are able to clear the suspect ACH item, they will notify the USGO 115 so that it can transmit the ACH item to the foreign gateway operator 110 in steps 995 and 996.

In conclusion, the present invention, as represented in the foregoing exemplary embodiments, provides a system and method for efficiently screening electronic financial transactions. The screening software module can compare an ACH item against an interdiction list comprising information about persons who are prohibited from conducting certain financial transactions. The screening software module uses an indicator to identify whether the screening software received any matches with persons identified on the interdiction list. The screening software module can also use a database of false positives to reduce the number of actual item matches that are returned or investigated.

It will be appreciated that the present invention fulfills the needs of the prior art described herein and meets the above-stated objects. While there has been shown and described the preferred embodiment of the invention, it will be evident to those skilled in the art that various modifications and changes can be made thereto without departing from the spirit and the scope of the invention. For instance, the present invention could be implemented in a variety of data networks that handle electronic financial transactions. Additionally, as described above, the screening process can be performed at a variety of different steps throughout the transmission of the electronic financial transaction. Furthermore, the screening process can be implemented without utilizing indicators to indicate whether there is a match or a false positive. The scope of the present invention is to be limited only by the claims below and equivalents thereof.

We claim:

1. A computer-implemented method for screening an automated clearinghouse ("ACH") item between a sending customer and a receiving customer, comprising the steps of:
 receiving a NACHA formatted ACH file comprising the ACH item from a first financial institution;
 determining at a screening module whether at least one of the sending customer and the receiving customer is identified on an interdiction list, the interdiction list comprising information identifying at least one person or entity that is prohibited from conducting a financial transaction; and
 in response to the foregoing determining step, the screening module inserting an indicator in the NACHA formatted ACH file, the indicator for use in further processing of the ACH file and being associated with the ACH item and indicating whether the at least one of the sending customer and the receiving customer is identified on the interdiction list,
 wherein the screening module is implemented in a computer system that comprises instructions stored in a machine-readable medium and a processor that executes the instructions.

2. The computer-implemented method according to claim 1, wherein the indicator indicates that at least one of the sending customer and the receiving customer is identified on the interdiction list.

3. The computer-implemented method according to claim 1, wherein the indicator indicates that neither the sending customer nor the receiving customer is identified on the interdiction list.

4. The computer-implemented method according to claim 1, further comprising the step of submitting a notification to a law enforcement authority in response to a determination that at least one of the sending customer and the receiving customer is identified on the interdiction list.

5. The computer-implemented method according to claim 4, wherein the notification comprises a copy of the ACH item.

6. The computer-implemented method according to claim 1, wherein the step of determining whether at least one of the sending customer and the receiving customer is identified on an interdiction list comprises the step of determining whether at least one of the name of the sending customer and the name of the receiving customer is on the interdiction list.

7. The computer-implemented method according to claim 1, wherein the first financial institution is a gateway operator.

8. The computer-implemented method according to claim 1, wherein the first financial institution is an originating depository financial institution.

9. The computer-implemented method according to claim 1, further comprising the step of transmitting the ACH item to a second financial institution in response to a determination that neither the sending customer nor the receiving customer is identified on the interdiction list.

10. The computer-implemented method according to claim 9, wherein the second financial institution is a gateway operator.

11. The computer-implemented method according to claim 9, wherein the second financial institution is a receiving depository financial institution.

12. The computer-implemented method according to claim 1, further comprising the step of determining whether the ACH item should be processed in response to a determination that at least one of the sending customer and the receiving customer is identified on the interdiction list.

13. The computer-implemented method according to claim 12, wherein the step of determining whether the ACH item should be processed comprises the steps of:
 determining whether the at least one customer identified on the interdiction list is identified on a list of false positives; and
 responsive to a determination that the at least one customer is identified on the list of false positives, determining that the ACH item should be processed.

14. The computer-implemented method according to claim 12, wherein the step of determining whether the ACH item should be processed comprises the step of transmitting a request to the first financial institution for instructions on whether the ACH item should be processed.

15. The computer-implemented method according to claim 1, wherein the step of determining whether at least one of the sending customer and the receiving customer is identified on the interdiction list comprises the steps of:
 determining whether at least one of the name of the sending customer and the name of the receiving customer is on the interdiction list;
 responsive to a determination that at least one of the name of the sending customer and the name of the receiving customer is on the interdiction list, determining whether the at least one customer named on the interdiction list is identified on a list of false positives; and
 determining that the at least one customer named on the interdiction list is not identified on the interdiction list in response to a determination that the at least one customer named on the interdiction list is identified on the list of false positives.

16. The computer-implemented method according to claim 1, wherein the information in the interdiction list is generated independently of the ACH file and the ACH item.

17. A computer program product having stored therein a set of instructions that, when executed, cause a computer to implement a process of screening an automated clearinghouse ("ACH") item between a sending customer and a receiving customer, the process comprising the steps of:
 determining whether at least one of the sending customer and the receiving customer is identified on an interdiction list, the interdiction list comprising information identifying at least one person or entity that is prohibited from conducting a financial transaction, and
 in response to determining that at least one of the sending customer and the receiving customer is identified on the interdiction list, inserting a first indicator into an ACH file that comprises the ACH item, the first indicator for use in further processing of the ACH file and indicating that at least one of the sending customer and the receiving customer is identified on the interdiction list.

18. The computer product of claim 17, wherein the process further comprises the step of, in response to determining that neither the sending customer nor the receiving customer is identified on the interdiction list, inserting into the ACH file a second indicator for use in further processing of the ACH file, the second indicator indicating that neither the sending customer nor the receiving customer is identified on the interdiction list.

19. The computer product of claim 17, wherein the ACH file is a NACHA formatted file.

20. The computer product of claim 17, wherein the process further comprises the step of, responsive to determining that at least one of the sending customer and the receiving customer is identified on the interdiction list, transmitting a notification of the identification to a law enforcement authority.

21. The computer product of claim 20, wherein the law enforcement authority is the U.S. Department of the Treasury Office of Foreign Assets Control (OFAC).

22. The computer product of claim 20, wherein the notification comprises a copy of the ACH item.

23. The computer product of claim 17, wherein the process further comprises the steps of:
 determining whether at least one of the name of the sending customer and the name of the receiving customer is on the interdiction list;
 responsive to determining that at least one of the name of the sending customer and the name of the receiving customer is on the interdiction list, determining whether the at least one customer identified on the interdiction list is identified on a list of false positives, and
 responsive to determining that the at least one customer is identified on the list of false positives, determining that the at least one customer is not identified on the interdiction list.

24. The computer product of claim 17, wherein the information in the interdiction list is generated independently of the ACH file and the ACH item.

25. A computer-implemented method for screening an automated clearinghouse ("ACH") item between a sending customer and a receiving customer, comprising the steps of:
 creating a NACHA formatted ACH file comprising the ACH item at a first financial institution;
 determining at a screening module whether at least one of the sending customer and the receiving customer is identified on an interdiction list, the interdiction list comprising information identifying at least one person or entity that is prohibited from conducting a financial transaction; and
 in response to the foregoing determining step, the screening module inserting an indicator in the NACHA formatted ACH file, the indicator for use in further processing of the ACH file and being associated with the ACH item and indicating whether the at least one of the sending customer and the receiving customer is identified on the interdiction list,
 wherein the screening module is implemented in a computer system that comprises instructions stored in a machine-readable medium and a processor that executes the instructions.

26. The computer-implemented method according to claim 25, wherein the indicator indicates that at least one of the sending customer and the receiving customer is identified on the interdiction list.

27. The computer-implemented method according to claim 25, wherein the indicator indicates that neither the sending customer nor the receiving customer is identified on the interdiction list.

28. The computer-implemented method according to claim 25, further comprising the step of, responsive to a determination that at least one of the sending customer and the receiving customer is identified on the interdiction list, submitting a notification of the identification to a law enforcement authority.

29. The computer-implemented method according to claim 28, wherein the notification comprises a copy of the ACH item.

30. The computer-implemented method according to claim 25, wherein the step of determining whether at least one of the sending customer and the receiving customer is identified on an interdiction list comprises the step of determining whether at least one of the name of the sending customer and the name of the receiving customer is on the interdiction list.

31. The computer-implemented method according to claim 25, wherein the first financial institution is a gateway operator.

32. The computer-implemented method according to claim 25, wherein the first financial institution is an originating depository financial institution.

33. The computer-implemented method according to claim 25, further comprising the step of transmitting the ACH item to a second financial institution.

34. The computer-implemented method according to claim 33, wherein the second financial institution is a gateway operator.

35. The computer-implemented method according to claim 33, wherein the second financial institution is a receiving depository financial institution.

36. The computer-implemented method according to claim 25, further comprising the step of determining whether the ACH item should be processed in response to a determination that at least one of the sending customer and the receiving customer is identified on the interdiction list.

37. The computer-implemented method according to claim 36, wherein the step of determining whether the ACH item should be processed comprises the steps of:
 determining whether the at least one customer identified on the interdiction list is identified on a list of false positives; and
 responsive to a determination that the at least one customer is identified on the list of false positives, determining that the ACH item should be processed.

38. The computer-implemented method according to claim 25, wherein the step of determining whether at least one of the sending customer and the receiving customer is identified on the interdiction list comprises the steps of:
 determining whether at least one of the name of the sending customer and the name of the receiving customer is on the interdiction list;
 responsive to a determination that at least one of the name of the sending customer and the name of the receiving customer is on the interdiction list, determining whether the at least one customer identified on the interdiction list is identified on a list of false positives; and
 responsive to a determination that the at least one customer is identified on the list of false positives, determining that the at least one customer is not identified on the interdiction list.

39. The computer-implemented method according to claim 25, wherein the information in the interdiction list is generated independently of the ACH file and the ACH item.

* * * * *